United States Patent
Alford

(12) 
(10) Patent No.: US 6,350,821 B1
(45) Date of Patent: Feb. 26, 2002

(54) MATTE POWDER COATING

(75) Inventor: William H. Alford, Livonia, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/340,633

(22) Filed: Jun. 28, 1999

(51) Int. Cl.$^7$ .................. C09D 167/02; C09D 163/00
(52) U.S. Cl. .................. 525/438; 525/444; 428/413
(58) Field of Search .................. 525/438; 428/413

(56) References Cited

U.S. PATENT DOCUMENTS 5,264,529 A  * 11/1993  Nozaki

FOREIGN PATENT DOCUMENTS

| EP | 0 136 263 A2 | 8/1984 | ............ C09D/3/58 |
| EP | 0 467 599 A2 | 3/1991 | ......... C09D/163/00 |
| WO | WO 91/14745 | 3/1991 | ......... C09D/167/00 |
| WO | WO 95/01407 | 1/1995 | ......... C09D/167/02 |

OTHER PUBLICATIONS

English Translation of EP 0 136 263, Widmer, Schmid, entitled "Duroplasticpowder coating and a metal container with a welded seam cover made of duroplast...", Apr. 3, 1985, pp. 1–15.

International Search Report for PCT/US 00/15517, pp. 1–3.

* cited by examiner

*Primary Examiner*—David J. Buttner
(74) *Attorney, Agent, or Firm*—Jennifer Loope Selby

(57) ABSTRACT

A matte powder coating composition including a first carboxyl-functional polyester resin, a second carboxyl-functional polyester resin, and an epoxide-functional crosslinking agent, where the difference in acid values between the first and second carboxyl-functional polyester resins is from about 200 to about 350 mg KOH/g.

28 Claims, No Drawings

MATTE POWDER COATING

FIELD OF THE INVENTION

The present invention relates to low gloss, ultraviolet-durable, matte powder coating compositions and a method for preparing such matte powder coating compositions, and more particularly to matte powder coating compositions including two carboxyl-functional polyester resins having a difference in acid values of from about 200 to about 350 mg KOH/g.

BACKGROUND AND SUMMARY OF THE INVENTION

Powder coatings have become increasingly important because they give off very little volatile material to the environment during application and during cure. Typically, any such emissions are limited to minor amounts of by-products from the curing reaction, such as blocking agents or volatile condensation products.

There is also an increasing need for matte powder coatings exhibiting ultra-low gloss and ultraviolet-durable characteristics. Matte finishes in powder coatings typically may be achieved by crosslinking two epoxy resins with a curing agent, such as a mono- or di-salt of a polycarboxylic acid and cyclic amidine. The two resins employ incompatible crosslinking mechanisms, where the first resin has a fast cure time, and the second resin cures at a slower rate and has a different shrinking or expanding coefficient than the first resin. The resulting micro-roughness of the coating surface scatters light, providing a low-gloss surface. These coatings are typically not, however, ultraviolet-durable or stable such that the components of the coating will degrade when exposed to ultraviolet light.

Other known matte powder coatings employ triglycidyl isocyanurate (TGIC) as a crosslinking agent in a polyester resin system. The most common approach of lowering the gloss of this type of coating is to extrude two different resin systems that differ only in their level of reactivity. The two resin systems are processed independent of one another, and are blended together after grinding of the powder coating is completed. The combination of a high reactivity powder with a low reactivity powder causes an incompatibility in the system, lowering the gloss. This type of powder coating, however, is limited to gloss ranges only as low as 30% gloss at a 60° angle. It would, therefore, be desirable to produce matte powder coating systems that yield lower gloss ranges and can be processed by a single extrusion step.

The present invention provides a matte powder coating composition including a first carboxyl-functional polyester resin, a second carboxyl-functional polyester resin, and an epoxide-functional crosslinking agent, where the difference in acid values between the first and second carboxyl-functional polyester resins is from about 200 to about 350 mg KOH/g.

The present invention also provides a matte powder coating composition comprising a first carboxyl-functional polyester resin having an acid value of from about 30 mg KOH/g to about 80 mg KOH/g. The coating also includes a second carboxyl-functional polyester resin having an acid value of from about 300 mg KOH/g to about 330 mg KOH/g and an epoxide-functional crosslinking agent. The first and second carboxyl-functional polyester resins are extruded together in a single step process.

The present invention additionally provides a method of preparing a matte powder coating composition comprising the steps of dry blending together two carboxyl-functional polyester resins and an epoxide-functional crosslinking agent, producing a substantially homogeneous mixture. The mixture is next melt blended in an extruder in a single step process, producing an extrudate. The extrudate is then pulverized. The difference in acid values between the two carboxyl-functional polyester resins is from about 200 mg KOH/g to about 350 mg KOH/g.

The present invention further provides a coated substrate coated by the method including applying a matte powder coating composition to the substrate. The matte powder coating comprises a first carboxyl-functional polyester resin, a second carboxyl-functional polyester resin, and an epoxide-functional crosslinking agent, and the difference in acid values between the first and second carboxyl-functional polyester resins is from about 200 to about 350 mg KOH/g. The method also includes curing the matte powder coating composition.

DETAILED DESCRIPTION

The polyester resins of the present invention have an average of two or more carboxyl groups per molecule. Such polyester resins are obtained by the condensation reaction between a poly-functional acid component and a polyol component. The equivalents of acid are in excess so that an acid-functional polyester is formed. According to the present invention, at least two carboxy-functional polyester resins are employed in the powder coating composition. In a preferred embodiment, the difference in acid values between the polyester resins is between about 200 to about 350, and most preferably between about 265 to about 345. The first polyester resin preferably has an acid value of about 30 mg KOH/g to about 80 mg KOH/g. In a preferred embodiment, the first polyester has an acid value of about 35 mg KOH/g. In addition, the powder coating composition includes a second polyester resin that has a substantially higher acid number, preferably an acid value of about 280 mg KOH/g to about 380 mg KOH/g, and more preferably about 300 mg KOH/g to 330 mg KOH/g. In a most preferred embodiment, the second polyester resin has an acid value of about 320 mg KOH/g.

The poly-functional acid component used to prepare each of the polyester resins comprises compounds having two or more carboxyl groups or their anhydrides. Such compounds may be alkylene, aralkylene, or aromatic compounds. Dicarboxylic acids and anhydrides of dicarboxylic acids are preferred. Acids or anhydrides with higher functionality may be used when some branching of the polyester is desired. When tri-functional compounds or compounds of higher functionality are used, it is also possible to include monofunctional carboxylic acids or anhydrides of monocarboxylic acids, such as versatic acid, fatty acids, or neodecanoic acid, so long as the poly-functional acid component has an average functionality of at least about two.

Illustrative examples of compounds having two or more carboxyl groups or anhydrides of such compounds include, without limitation, phthalic acid, phthalic anhydride, isophthalic acid, terephthalic acid, tetrahydrophthalic acid, hexahydrophthalic acid, tetrachlorophthalic anhydride, hexahydrophthalic anhydride, pyromellitic anhydride, succinic acid, azelaic acid, adipic acid, 1,4-cyclohexanedicarboxylic acid, citric acid, oxalic acid, maleic acid, malonic acid, maleic anhydride, glutaric acid, pimelic acid, trimellitic anhydride, and combinations of these.

The polyol component used to make the polyester resins also has an average functionality of at least about two. The polyol component may contain mono-, di-, and tri-functional alcohols, as well as alcohols of higher functionality. Diols are preferred as the polyol component. Alcohols with higher functionality may be used when some branching of the polyester is desired, and mixtures of diols and triols are also preferred as the polyol component.

Examples of useful polyols include, without limitation, ethylene glycol, diethylene glycol, triethylene glycol, propylene glycol, dipropylene glycol, butylene glycol, glycerine, trimethylolpropane, trimethylolethane, pentaerythritol, 1,4-butanediol, neopentyl glycol, 2,2,4-trimethyl-1,3-pentanediol, 1,6-hexanediol, 1,4-cyclohexanedimethanol, hydrogenated bisphenol A, hydroxyalkylated bisphenols, and combinations of these.

The methods of making polyester resins are well-known. Polyesters are typically formed by heating together the polyol and poly-functional acid components, with or without catalysis, while removing the by-product of water in order to drive the reaction to the desired extent of completion. A small amount of a solvent, such as toluene, may be added in order to help remove the water azeotropically. If added, such solvent is preferably removed from the polyester product before powder coating formulation is begun.

The matte powder coatings of the present invention also include an epoxide-functional crosslinking agent. The epoxide functionality is reactive toward the carboxyl groups of the polyester resins. Examples of crosslinking agents may be, without limitation, epoxide-functional compounds such as epoxide-functional epoxy resins and epoxide-functional acrylic resins. Suitable examples of epoxide-functional epoxy resins include, without limitation, bisphenol A-type epoxy resins, novolac epoxy resins, and alicyclic epoxy resins. In a preferred embodiment, triglycidyl isocyanurate (TGIC) is employed as a crosslinking agent in the matte powder coating. The use of TGIC provides a matte powder coating that is ultraviolet-durable, as TGIC does not breakdown and cause chalking of the coating surface when exposed to ultraviolet rays.

The first polyester resin of the present invention coating, i.e., the polyester resin with an acid value of from about 30 mg KOH/g to about 80 mg KOH/g, is included in an amount of from about 30% to about 90% by weight, and preferably in an amount of from about 40% to about 70% by weight, based on the weight of the solid vehicle. The second polyester resin, i.e., the polyester resin with an acid value of from about 300 mg KOH/g to about 330 mg KOH/g, is utilized in an amount of from about 1% to about 30% by weight, and preferably in an amount of from about 15% to about 25% by weight, based on the weight of the solid vehicle. The crosslinking agent is utilized in amounts of from about 5% to about 30% by weight, and preferably in amounts of from about 10% to about 20% by weight, based on the weight of the solid vehicle.

The matte powder coating of the present invention provides an ultra-low gloss of from about 0.7%(60° angle) to about 30%(60° angle), and from about 3.8%(85° angle) to about 50(85° angle). While not wishing to be bound by theory, it is believed that the low gloss results from an incompatibility between the two carboxyl-functional polyester resins employed in the coating composition. It is thought that, because one of the resins has a much higher acid number, for example 320, and the other resin has a low acid number, for example 35, the resins cure at different rates. As a result, the resin system may not completely flow out, but instead a rough and uneven coating surface is believed to result after the resins are crosslinked with the crosslinking agent. Thus, combining a high reactivity resin with a low reactivity resin causes an incompatibility in the system and lowers the gloss of the coating.

Additionally, the present invention coating can be extruded in a single step process, rather than having to extrude two different resin systems that are processed independently of each other and blended together after grinding is completed. Therefore, according to the present invention, a matte powder coating with an ultra-low gloss is produced using a single extrusion step.

In addition to the polyesters and crosslinking agents, it may be desirable to incorporate into the powder coating composition other materials, such as fillers, pigments, leveling agents to help coalesce the film, plasticizers, flow control agents, air release agents, hindered amine light stabilizers and ultraviolet light absorbers, antioxidants, and/or catalysts.

Pigments and/or fillers may be utilized in amounts between 0 and 60% by weight, based on the total weight of the coating composition. Inorganic pigments or fillers may be used, including metal oxides, chromates, molybdates, phosphates, and silicates. Examples of inorganic pigments that could be employed are, without limitation, titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ammonium ferrocyanide (Prussian blue), ultramarine, lead chromate, and lead molybdate. Organic pigments may also be used. Examples of useful organic pigments are, without limitation, metallized and non-metallized azo reds, quinacridone reds and violets, perylene reds, copper phthalocyanine blues and greens, carbazole violet, monoarylide and diarylide yellows, benzimidazole yellows, tolyl orange, naphthol orange, and the like.

Flow modifiers or control agents may be used to prevent the formation of craters by reducing surface tension. Cratering may be caused in part by dirt falling upon the coating before it is cured. Flow control agents are generally non-functional, low $T_g$ polymers, such as acrylic or siloxane polymers or fluorinated polyesters. Examples of flow control agents commonly used are polylauryl acrylate, polybutyl acrylate, poly(2-ethylhexyl) acrylate, polylauryl methacrylate, poly-(dimethylsiloxane), esters of polyethylene glycol or polypropylene glycol, and fluorinated fatty acids. When used, flow control agents are typically used in relatively low amounts.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from about 80° C. to about 130° C.

The extrudate is then cooled and pulverized. The extrudate may be crushed to a fine flake or granule and then ground and classified by sieving or other means. The maximum particle size and the particle size distribution are controlled in the classifying step. Requirements for these parameters depend upon the particular use and application method.

The thermosetting powder coating composition of the present invention can be applied onto many different substrates, including metal substrates such as bare steel, phosphatized steel, galvanized steel, or aluminum; and non-metallic substrates, such as plastics and composites. The substrate may also be any of these materials having upon it already a layer of another coating, such as a layer of an electrodeposited primer, cured or uncured, before the application of the powder coating compositions. In a preferred embodiment, the substrates to be coated are automotive components, office furniture, pipes, reinforced bars, appliances, architectural components, and general metal components, such as lawn mowers, lawn furniture, and bicycle frames.

Application of the matte powder coating can be, for example, by electrostatic spraying or by use of a fluidized bed. Electrostatic spraying is the preferred method. The coating powder can be applied in one or more passes to provide a film thickness after cure of from about 25 to about 150 microns. The substrate can optionally be preheated prior to application of a powder coating composition to promote thicker powder deposition.

After application of the coating composition to the substrate, the coating is cured, preferably by heating at a temperature and for a length of time sufficient to cause the reactants to form an insoluble polymeric network. The cure temperature is usually from about 150° C. to about 230° C., and the length of cure is usually about 10 minutes to about 60 minutes. Preferably, the coating is cured at about 180° C. to about 190° C. for about 15 to about 25 minutes.

The invention is further described in the following examples. The examples are merely illustrative and do not in any way limit the scope of the invention as described and claimed. Unless stated otherwise, the parts given are parts by weight.

EXAMPLES

Example 1
Low Gloss Powder Coating

|  | A | B |
|---|---|---|
|  | (parts by weight) | |
| Ruco 911 (RUCO Polymer Corp.) | 43.4 | 43.1 |
| Ruco XP-5600 (RUCO Polymer Corp.) | 13.0 | 12.9 |
| TGIC | 11.2 | 11.1 |
| Flow Control Agent | 0.65 | 0.65 |
| Degassing Agent | 0.50 | 0.50 |
| Carbon Black Pigment | 1.25 | 1.25 |
| Dispersing Agent | — | 0.50 |
| Pigment Extender | 30.0 | 30.0 |
| Total | 100.0 | 100.0 |

|  | Acid # | Eq. Wt. | A | B |
|---|---|---|---|---|
| Ruco 911 | 35 | 1602 | 43.4 | 43.1 |
| Ruco XP-5600 | 320 | 175.3 | 13.0 | 12.9 |
| TGIC |  | 107 | 11.2 | 11.1 |

-continued

| Total | 67.6 | 67.1 |
|---|---|---|
| 60° Specular gloss (%) | 0.7 | 0.8 |
| 85° Specular gloss (%) | 3.7 | 4.0 |

The invention has been described in detail with reference to preferred embodiments thereof. It should be understood, however, that variations and modifications can be made within the spirit and scope of the invention.

What is claimed is:
1. A matte powder coating composition comprising:
   (a) a first carboxyl-functional polyester resin;
   (b) a second carboxyl-functional polyester resin having an acid value of at least about 300 mg KOH/g; and
   (c) an epoxide-functional crosslinking agent; wherein the difference in acid values between said first and second carboxyl-functional polyester resins is from about 200 to about 350 mg KOH/g.
2. A matte powder coating composition according to claim 1, wherein the difference in said acid values is from about 265 to about 345 mg KOH/g.
3. A matte powder coating composition according to claim 1, wherein said first carboxyl-functional polyester resin has an acid value of about 30 to about 80 mg KOH/g.
4. A matte powder coating composition according to claim 3, wherein said first carboxyl-functional polyester resin has an acid value of about 35 mg KOH/g.
5. A matte powder coating composition according to claim 1, wherein said second carboxyl-functional polyester resin has an acid value of up to about 380 mg KOH/g.
6. A matte powder coating composition according to claim 5, wherein said second carboxyl-functional polyester resin has an acid value of about 320 mg KOH/g.
7. A matte powder coating composition according to claim 1, wherein said coating composition forms a coating having a gloss value measured at a 60° angle of about 0.7% to about 30%.
8. A matte powder coating composition according to claim 1, wherein said crosslinking agent comprises triglycidyl isocyanurate.
9. A matte powder coating composition according to claim 1, wherein said coating is ultraviolet-durable.
10. A matte powder coating composition comprising:
    (a) a first carboxyl-functional polyester resin having an acid value of from about 30 to about 80 mg KOH/g;
    (b) a second carboxyl-functional polyester resin having an acid value of from about 300 to about 330 mg/KOH/g; and
    (c) an epoxide-functional crosslinking agent;
    wherein said first and second carboxyl-functional polyester resins are extruded together in a single step process.
11. A matte powder coating composition according to claim 10, wherein said first carboxyl-functional polyester resin has an acid value of about 35 mg KOH/g.
12. A matte powder coating composition according to claim 10, wherein said second carboxyl-functional polyester resin has an acid value of about 320 mg KOH/g.
13. A matte powder coating composition according to claim 10, wherein said coating composition forms a coating having a gloss value measured at a 60° angle of about 0.7% to about 30%.
14. A matte powder coating composition according to claim 10, wherein said crosslinking agent comprises triglycidyl isocyanurate.

15. A matte powder coating composition according to claim 10, wherein said coating is ultraviolet-durable.

16. A matte powder coating composition according to claim 10, wherein said first carboxyl-functional polyester resin is present in the amount of about 30% to about 90%, based on the total weight of said first and second polyester resins and said epoxide-functional crosslinking agent.

17. A matte powder coating composition according to claim 10, wherein said second carboxyl-functional polyester resin is present in the amount of about 1% to about 30%, based on the total weight of said first and second polyester resins and said epoxide-functional crosslinking agent.

18. A matte powder coating composition according to claim 10, wherein said epoxide-functional crosslinking agent is present in the amount of about 1% to about 30%, based on the total weight of said first and second polyester resins and said epoxide-functional crosslinker.

19. A method of preparing a matte powder coating composition comprising the steps of:

(a) blending together two carboxyl-functional polyester resins, one of which has an acid value of at least about 300 mg KOH/g, and an epoxide-functional crosslinking agent, producing a substantially homogeneous mixture; and (b) extruding said mixture in a single step process; wherein the difference in acid values between said two carboxyl-functional polyester resins is from about 200 to about 350 mg KOH/g.

20. A method according to claim 19 wherein said crosslinker comprises triglycidyl isocyanurate.

21. A method according to claim 19 wherein the difference in said acid values is from about 265 to about 295 mg KOH/g.

22. A method according to claim 19 wherein said coating is ultraviolet-durable.

23. A method according to claim 19 wherein said coating composition forms a coating having a gloss value measured at a 60° angle of about 0.7% to about 30%.

24. A coated substrate coated by the method comprising the steps of:

(a) applying a matte powder coating composition to said substrate, wherein said matte powder coating composition comprises a first carboxyl-functional polyester resin, a second carboxyl-functional polyester resin having an acid value of at least about 300 mg KOH/g, and an epoxide-functional crosslinking agent, wherein the difference in acid values between said first and second carboxyl-functional polyester resins is from about 200 to about 350 mg KOH/g; and (b) curing said matte powder coating composition.

25. A coated substrate according to claim 24, wherein said first carboxyl-functional polyester resin has an acid value of about 30 to about 80 mg KOH/g.

26. A coated substrate according to claim 24, wherein said second carboxyl-functional polyester resin has an acid value of up to about 380 mg KOH/g.

27. A coated substrate according to claim 24 wherein said crosslinking agent comprises triglycidyl isocyanurate.

28. A coated substrate according to claim 24, wherein said coated substrate has a coating with a gloss value measured at a 60° angle of about 0.7% to about 30%.

* * * * *